(12) United States Patent
Johnson

(10) Patent No.: US 9,015,671 B2
(45) Date of Patent: Apr. 21, 2015

(54) INTEGRATING PROGRAM CONSTRUCTION

(75) Inventor: Steve Johnson, Sudbury, MA (US)

(73) Assignee: The MathWorks, Inc., Natick, MA (US)

(*) Notice: Subject to any disclaimer, the term of this patent is extended or adjusted under 35 U.S.C. 154(b) by 2094 days.

(21) Appl. No.: 11/646,147

(22) Filed: Dec. 27, 2006

(65) Prior Publication Data

US 2009/0070738 A1    Mar. 12, 2009

(51) Int. Cl.
*G06F 9/44* (2006.01)
*G06F 11/36* (2006.01)

(52) U.S. Cl.
CPC .................... *G06F 11/3688* (2013.01)

(58) Field of Classification Search
None
See application file for complete search history.

(56) References Cited

U.S. PATENT DOCUMENTS

| | | | | |
|---|---|---|---|---|
| 5,201,050 A * | 4/1993 | McKeeman et al. | ......... | 717/111 |
| 5,313,387 A * | 5/1994 | McKeeman et al. | ............ | 700/90 |
| 5,327,568 A * | 7/1994 | Maejima et al. | .............. | 717/147 |
| 5,781,776 A * | 7/1998 | Johnston et al. | .............. | 717/130 |
| 6,195,765 B1 * | 2/2001 | Kislanko et al. | ................ | 714/38 |
| 6,202,200 B1 * | 3/2001 | House et al. | .................. | 717/100 |
| 6,249,882 B1 * | 6/2001 | Testardi | .......................... | 714/38 |
| 6,367,068 B1 * | 4/2002 | Vaidyanathan et al. | ...... | 717/143 |
| 6,408,430 B2 * | 6/2002 | Gunter et al. | .................. | 717/109 |
| 6,493,868 B1 * | 12/2002 | DaSilva et al. | ............... | 717/105 |
| 6,694,509 B1 * | 2/2004 | Stoval et al. | ................... | 717/124 |
| 6,792,595 B1 * | 9/2004 | Storistenau et al. | .......... | 717/110 |
| 6,971,084 B2 * | 11/2005 | Grey et al. | .................... | 717/106 |
| 7,089,534 B2 * | 8/2006 | Hartman et al. | ............... | 717/125 |
| 7,127,704 B2 * | 10/2006 | Van De Vanter et al. | ..... | 717/112 |
| 7,257,804 B2 * | 8/2007 | Baecker et al. | ............... | 717/124 |
| 7,584,452 B1 * | 9/2009 | Johnson | ......................... | 717/116 |
| 7,636,914 B1 * | 12/2009 | Johnson | ......................... | 717/143 |
| 7,673,289 B1 * | 3/2010 | Johnson | ......................... | 717/126 |
| 7,784,030 B2 * | 8/2010 | Christfort et al. | ............. | 717/120 |
| 8,141,036 B2 * | 3/2012 | Wagner et al. | ................. | 717/113 |
| 8,281,286 B2 * | 10/2012 | Nguyen | ......................... | 717/125 |
| 8,561,021 B2 * | 10/2013 | Muharsky et al. | ............. | 717/113 |
| 2001/0037492 A1 * | 11/2001 | Holzmann | ......................... | 717/4 |
| 2002/0100016 A1 * | 7/2002 | Van De Vanter et al. | ..... | 717/112 |
| 2002/0100022 A1 * | 7/2002 | Holzmann | .................... | 717/126 |
| 2003/0005413 A1 * | 1/2003 | Beer et al. | ...................... | 717/125 |
| 2003/0163801 A1 * | 8/2003 | Thames et al. | ................ | 717/123 |
| 2003/0200533 A1 * | 10/2003 | Roberts et al. | ................ | 717/124 |
| 2003/0221184 A1 * | 11/2003 | Gunjal et al. | .................. | 717/118 |
| 2004/0143819 A1 * | 7/2004 | Cheng et al. | ................... | 717/125 |
| 2005/0223363 A1 * | 10/2005 | Black-Ziegelbein et al. | . | 717/127 |
| 2006/0041864 A1 * | 2/2006 | Holloway et al. | ............. | 717/124 |
| 2007/0011651 A1 * | 1/2007 | Wagner | .......................... | 717/110 |
| 2007/0169004 A1 * | 7/2007 | Prakash | ......................... | 717/131 |

(Continued)

OTHER PUBLICATIONS

David Gallardo, Getting started with the Eclipse Platform Using Eclipse plug-ins to edit, compile and debug your app Nov. 1, 2002, pp. 1-16.*

(Continued)

*Primary Examiner* — Tuan Q Dam
*Assistant Examiner* — Zheng Wei
(74) *Attorney, Agent, or Firm* — Nelson Mullins Riley & Scarborough LLP

(57) ABSTRACT

In one embodiment of the present invention, a method for concurrently constructing and testing a software program is provided. The method includes interacting with a program editor that allows a user to construct the program, and testing the program during construction of the program to produce a test result.

60 Claims, 14 Drawing Sheets

(56) References Cited

U.S. PATENT DOCUMENTS

2007/0226543 A1* 9/2007 Young et al. .................. 714/43
2008/0178143 A1* 7/2008 Dougan et al. ............... 717/100
2010/0287525 A1* 11/2010 Wagner ........................ 717/100
2011/0197176 A1* 8/2011 Muharsky et al. ........... 717/113

OTHER PUBLICATIONS

Eclipse Platform Technical Overview, published by IBM, Apr. 19, 2006, pp. 1-19.*
David Saff, Automatic Continuous Testing to Speed Software Development, published by Massachusetts Institute of Technology, Feb. 2004, pp. 1-164.*
Saff et al., Reducing wasted development time via continuous testing, published by MIT Computer Science & Aritical Intelligence Lab, 2003, pp. 281-292.*
European Office Action for Application No. 07868098.0, dated Jan. 29, 2010.
Saff, David et al., "An experimental evaluation of continuous testing during development," retrieved online at http://people.csail.mit.edu/mernst/pubs/ct-user-study-issta2004.pdf (2004).
Saff, David et al., "Continuous Testing in Eclipse," retrieved online at http://people.csail.mit.edu/mernst/pubs/conttest-plugin-etx2004.pdf (2004).
Saff, David et al., "Continuous Testing in Eclipse," *Electronic Notes in Theoretical Computer Science*, vol. 107:103-117 (2004).
International Search Report for Application No. PCT/US2007/026422, dated Sep. 29, 2008.
Saff, David et al., "Continuous Testing in Eclipse," Proceedings of the 27th International Conference on Software Engineering, ICSE 2005, pp. 668-669 (2005).

* cited by examiner

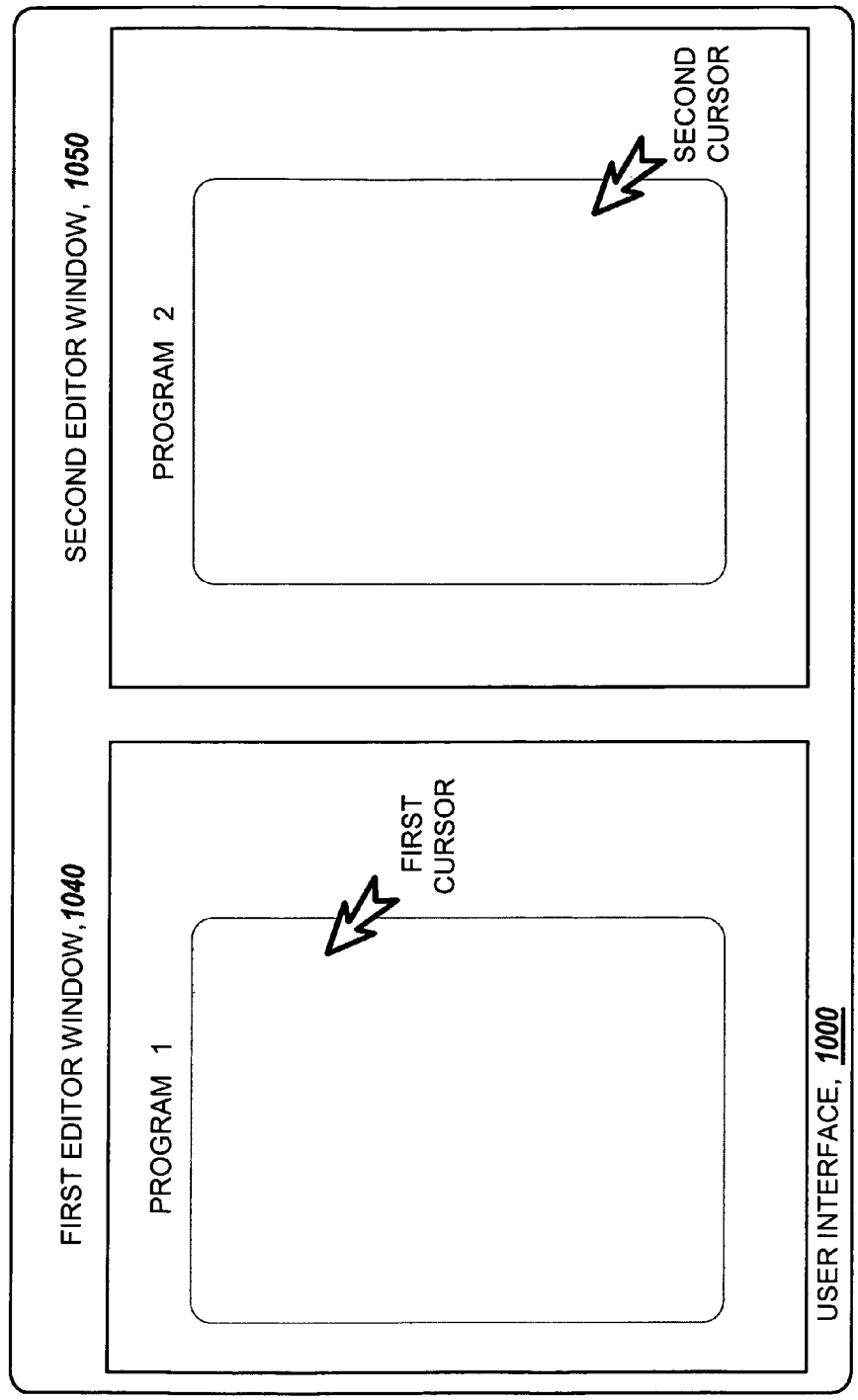

TESTING REPORT 1200

TEST NAME : LUNAR LANDER
— 1210
— 1212

LINES OF CODE : 25,000
— 1214

LINES TESTED : 25,000
— 1216

TEST RESULTS : ALL TESTS PASSED
— 1218

DETAILED TEST LOG : LUNAR_TEST.DAT
— 1220

CODE COVERAGE : 100%
— 1222

TIME REQUIRED FOR TEST COMPLETION : 360.45 SECONDS
— 1224

TEST RESULTS APPROVED BY : BOB MARLEY

*Fig. 12*

INTEGRATING PROGRAM CONSTRUCTION

BACKGROUND

Programmers can use a programming language to build functions, modules, and applications by writing text files containing code in the programming language. Once a program is written, it needs to be tested. Some programmers use a debugger to understand the behavior of the program in order to spot errors. Some programmers use test harnesses that automatically run tests against the program to see if the program produces expected results. If an error is detected, then the programmer usually returns to an editor to modify the code before tests are rerun to see if the errors are corrected. Traditionally, a user edits a program under an editing mode and/or environment. When the program is complete, a user may test the program by switching to a testing/debugger mode and/or environment. When an error is detected in the testing/debugger mode and/or environment, a user may return to the editing mode and/or environment to modify the program. After modification is made to the program, the user may return to the testing/debugger mode and/or environment to retest the program.

SUMMARY

In one embodiment, a method for simultaneously constructing and testing a software program is provided. The method includes interacting with a program editor that allows a user to construct the program, and testing the program during construction of the program to produce a test result.

In another embodiment, a system for simultaneously constructing and testing a software program is provided. The system includes a program editor that allows a user to construct a program, and a testing capability that interacts with the program editor and allows a test to be run on the program during construction of the program In still another embodiment, a medium storing executable instructions for causing a computing device to simultaneously construct and test a software program is provided. The instructions include instructions for interacting with a program editor that allows a user to construct the program, and testing the program during construction of the program to produce a test result.

In another embodiment, a computing device-implemented method for simultaneously constructing and testing between a first program and a second program is provided. The method includes interacting with a program editor to construct the first program and the second program, and testing the first program with the second program or testing the second program with the first program during construction of the first program or the second program to produce a first test result with respect to the first program or a second test result with respect to the second program.

In still another embodiment, a medium storing executable instructions for causing a computing device to simultaneously construct and test between a first program and the second program is provided. The medium includes instructions for interacting with a program editor to construct the first program and the second program, and instructions for testing the first program with the second program or testing the second program with the first program during construction of the first program or the second program to produce a first test result with respect to the first program or a second test result with respect to the second program.

In yet another embodiment, a system is provided where the system includes editor logic that constructs code, test logic that tests constructed code during code construction, and synchronization logic that interacts with the editor logic and the test logic to support testing the constructed code during code construction to produce a test result.

BRIEF DESCRIPTION OF THE FIGURES

The foregoing and other objects, aspects, features, and advantages of the invention will become more apparent and may be better understood by referring to the following description taken in conjunction with the accompanying drawings, in which:

FIG. 10B illustrates an exemplary user interface showing two editor windows with each editor including a program;

FIG. 12 illustrates an exemplary testing report that can be generated by an exemplary embodiment.

DETAILED DESCRIPTION

Exemplary embodiments of the present invention provide techniques, systems, and/or computer-readable mediums, etc., for concurrently editing and testing a program. For example, a user can run tests against code he/she is developing while the code is being developed. As a result, tests can be run against partially completed code without requiring the user to postpone testing until the code development effort is completed.

As a programmer codes, the programmer can immediately see if an error is indicated by a test failure. In one embodiment, the programmer can be informed of an error as early as when the programmer just finishes typing the line of code that contains the error. In one embodiment, excess processing power of a computing device can be used to run tests (e.g., while a central processing unit is idle). Running tests using excess and/or available processing resources may reduce testing and/or debugging time for programs.

Illustrative embodiments may further allow one or more breakpoints to be inserted in the code to help a user to debug the code. For example, the user may specify where he/she wants to place the breakpoints, such as a current position of the cursor. Illustrative embodiments may allow breakpoints to move in conjunction with the cursor so that a test can be stopped at a code portion proximate to a current cursor location. Breakpoints may allow a user to examine values of variables and/or other information about the code at locations identified using one or more breakpoints. These tests and/or breakpoints allow the user to identify unexpected code behavior within a program during program construction, instead of requiring the user to wait until code generation is complete, as may occur with conventional code development and testing techniques.

Figure 1:
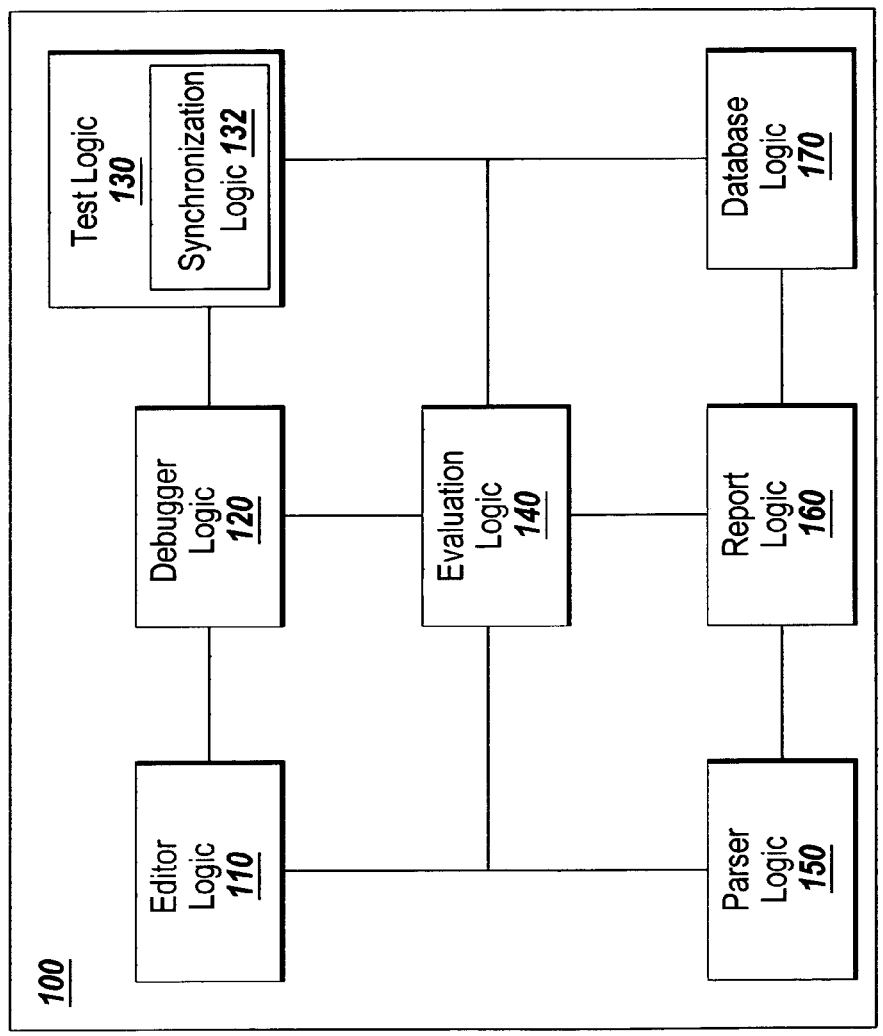
FIG. 1 depicts exemplary components suitable for practicing an exemplary embodiment.

FIG. 1 illustrates an exemplary computing device suitable for practicing exemplary embodiments. Computing device 100 may include a device that executes instructions to perform an operation. In one implementation, computing device 100 may include editor logic 110, debugger logic 120, test logic 130, evaluation logic 140, parser logic 150, report logic 160, and database logic 170. The number, types, and/or configuration of logic identified in connection with FIG. 1 is exemplary and should not be construed as limiting the number, types, and/or configuration of logic that an be used to perform operations used by exemplary embodiments disclosed herein. Other types of logic, configurations of logic, etc., will be obvious in view of the techniques and/or exemplary embodiments disclosed herein.

Editor logic 110 may include hardware and/or software based logic that implements editing functions on computing device 100. For example, editor logic 110 may operate a text and/or graphical editing window on computing device 100 to allow a user to create and/or modify text and/or graphical information. In one implementation, editor logic 110 may operate a text editor that allows a user to create text based code, such as text based programming code or modeling code.

Debugger logic 120 may include hardware and/or software based logic that implements debugging functions on computing device 100. For example, debugger logic 120 may operate a textual and/or graphical debugger on computing device 100 to allow a user to debug code, graphical modeling components, or other types of information related to a program, model, etc.

Test logic 130 may include hardware and/or software based logic that implements testing functions on computing device 100. In one implementation, test logic 130 may perform testing of code substantially simultaneously with construction of the code. For example, a user may be writing text based code for a program and test logic 130 may be running one or more determined tests on the code as the user is writing the code. Testing performed while code is being constructed is referred to as concurrent testing. Test logic 130 may run substantially any number of tests substantially simultaneously against partially completed code (e.g., code that is being written while testing is performed thereon).

Implementations of test logic 130 may create one or more conditions that can be used to test one or more behaviors associated with code being constructed on computing device 100. For example, test logic 130 may be configured to query the code, compare an answer or result generated by the code with one or more known answers/results, and/or verify the behavior of the code based on the comparison. Test logic 130 may further report the answer/result or information related to the answer/result to a user or to another device. Implementations of test logic 130 can perform testing on code that manipulates hardware, manipulates software, and/or that performs other functions.

Test logic 130 may include synchronization logic 132 that synchronizes testing with code that is under construction. For example, synchronization logic 132 may interact with parser logic 150 and may initiate one or more tests on code when parser logic 150 indicates that a sufficient amount of code exists with which a useful test can be performed. In one implementation, synchronization logic 132 may prevent testing from occurring until a certain amount of resources are available. For example, synchronization logic 132 may not allow concurrent testing to occur unless a central processing unit (CPU) in computing device 100 is idle. Synchronization logic 132 may allow processing resources on computing device 100 (e.g., evaluation logic 140) to be used efficiently since synchronization logic 132 may start processing data, such as testing functions, when a processing resource (e.g., a CPU) would otherwise be underutilized (e.g., operating at less than 100 percent).

Implementations of test logic 130 may operate in a state where one or more tests are attempting to run whenever code is being created. Tests may execute when parser logic 150 determines that a test can be run in a way that may produce a useful result. Information about a status for a particular test may be provided to a user via indicators, such as visual indicators, auditory indicators, etc. Test logic 130 may perform testing operations according to determined criteria. For example, an implementation of test logic 130 may determine that a last successful test should be run against newly created code, or a last unsuccessful test should be run against newly created code. Test logic 130 may randomly select one of a number of successful tests to run against newly created code, may re-run a test against an existing code portion to determine whether the code portion produces a result that matches an earlier result, etc. Implementations of test logic 130 may operate with detection logic that can identify a location in code (e.g., a break point) and may run a test to the location identified by the detection logic. In one implementation, a cursor position may identify a location for a break point. In another implementation, another type of indicator can identify the location of a break point.

Evaluation logic 140 may include hardware and/or software based logic that performs processing/evaluation operations. For example, evaluation logic 140 may be implemented in a processing device, such as a microprocessor, field programmable gate array (FPGA), application specific integrated circuit (ASIC), etc., and may perform processing operations associated with concurrent testing operations performed on behalf of a user. Implementation of evaluation logic 140 may receive information from or may send information to other devices, logic, etc., when performing processing/evaluation operations in computing device 100.

Parser logic 150 may include hardware and/or software based logic that performs parsing operations with respect to constructed code. For example, a user may be writing lines of text-based code in an editor. Parsing logic 150 may parse the written code to determine when enough code is present to perform a test, such as a test associated with test logic 130. Parsing logic 150 may parse information on a single line, such as characters and/or numbers, and/or may parse information contained in a number of lines, such as a number of lines of code making up a function or subroutine.

Implementations of parser logic 150 may be adaptive and may vary a quantity of characters, numbers, symbols, code lines, etc., used to determine when a test can be performed. In one implementation, parser logic 150 may reject code portions that are not in a state where a meaningful test can be run against the code portion. In another implementation, parser logic 150 may attempt to call code portions whether or not a code portion is in a state where a meaningful test can be run.

In this implementation, parser logic 150 may return an error when a test cannot be run against a selected code portion.

Report logic 160 may include hardware and/or software based logic to generate a report. For example, report logic 160 may generate a report on behalf of a user that has written a program. The report may be stored and retrieved using database logic 170. Report logic 160 may generate a report according to one or more determined criteria, such as formatting criteria, content criteria, size criteria, etc. Generated reports may be in electronic, hard copy, and/or other formats. Reports may include information about programs written by a user (e.g., information about a number of lines of code in the program), information about testing performed on code (e.g., names of tests performed), information about a date and/or time when testing and/or code generation was performed, information about a system on which testing was performed, information about code coverage, etc.

Figure 2:
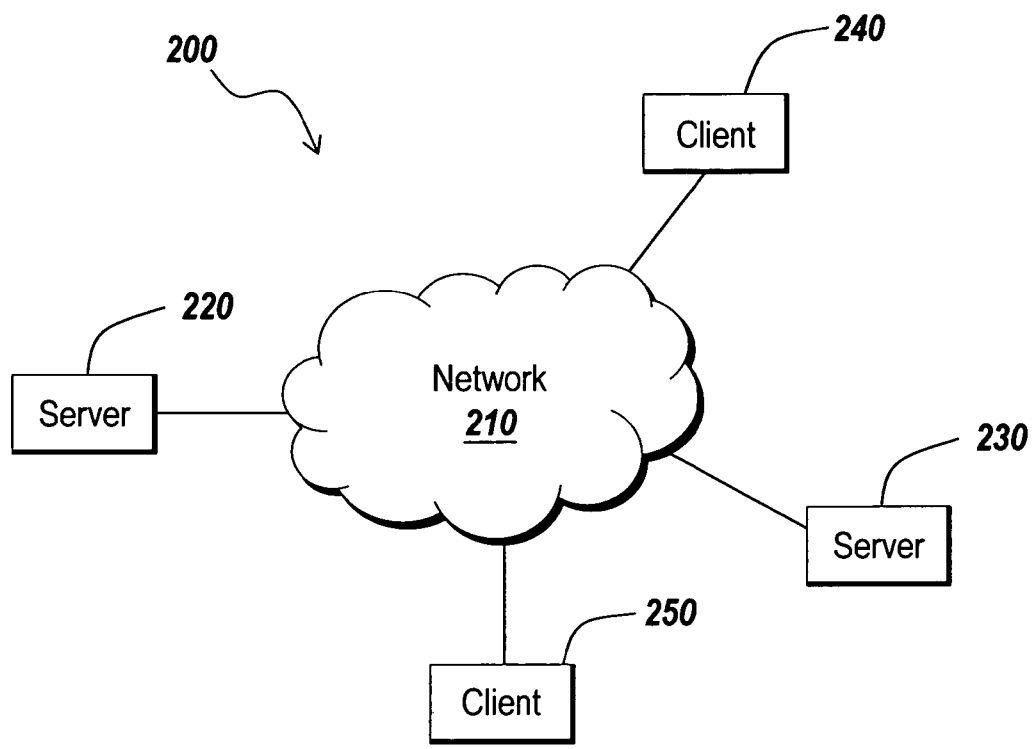
FIG. 2 depicts an exemplary distributed system suitable for practicing a distributed implementation.

FIG. 2 is an exemplary network environment 200 suitable for the distributed implementation of an illustrative embodiment. The network environment 200 may include one or more servers 220 and 230 coupled to clients 240 and 250 via a communication network 210. In one implementation, the servers 220 and 230 and/or the clients 240 and/or 250 can be implemented via the computing device 100. A network interface of the computing device 100 enables the servers 220 and 230 to communicate with the clients 240 and 250 through network 210.

Implementations of network 210 may include an intranet, Local Area Network (LAN), a Wide Area Network (WAN), Metropolitan Area Network (MAN), or the Internet through a variety of connection types including, but not limited to, standard telephone lines, LAN or WAN links, (e.g., 802.11, T1, T3, 56 kb, X.25), broadband connections, (e.g., Integrated Services Digital Network (ISDN), Frame Relay, asynchronous transfer mode (ATM)), wireless connections, etc., or some combination of any or all of the above. In addition the network 210 may use middleware, such as Common Object Request Broker Architecture (CORBA) or Distributed Component Object Model (DCOM) to allow a computing device on the network 210 to communicate directly with another computing device that is connected to the network 210.

Figure 3:
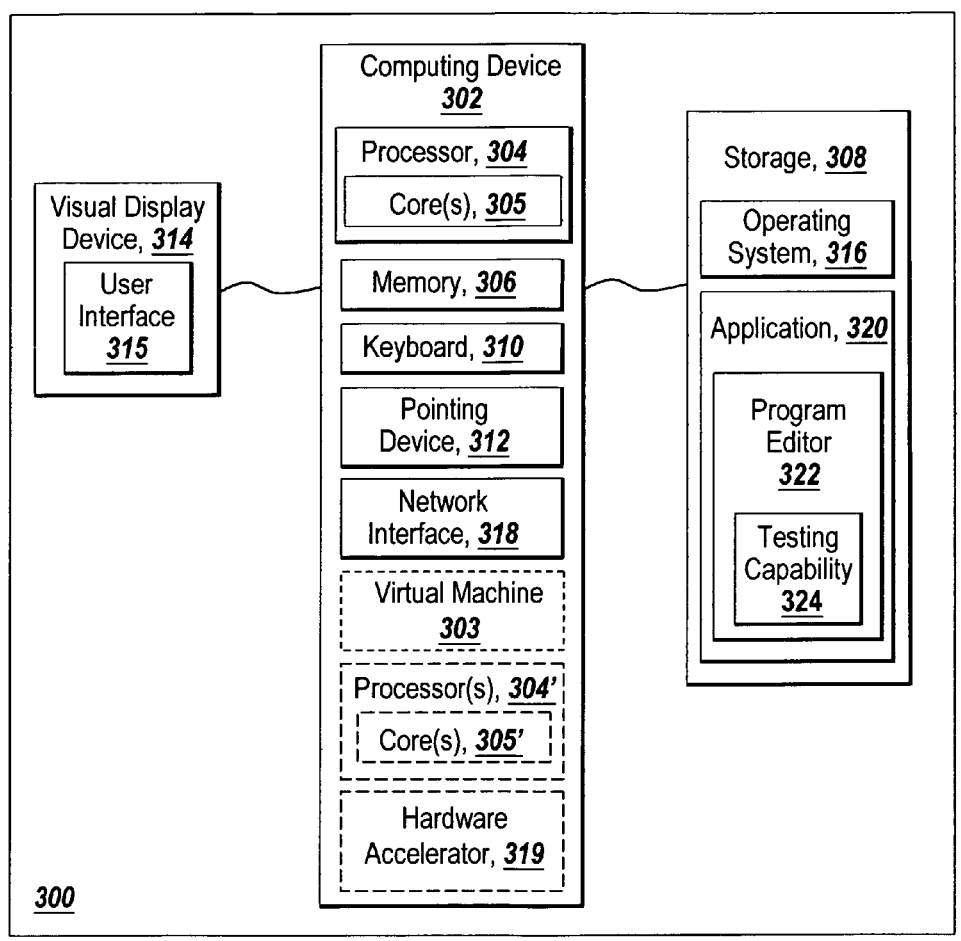
FIG. 3 is a block diagram of a computing device suitable for practicing an exemplary embodiment.

FIG. 3 depicts exemplary environment 300 suitable for practicing an exemplary embodiment of the present invention. Computing device 302 includes memory 306 to store software. The computing device 302 also includes processor 304, and optionally, one or more processor(s) 304' for executing software stored in the memory 306, and for executing other programs that can be used to control system hardware. Processor 304 and processor(s) 304' can each be a single core or multiple core (305 and 305') processor.

The memory 306 may include among other things a computer system memory or random access memory (RAM), such as dynamic random access memory (DRAM), static random access memory (SRAM), extended data out random access memory (EDO RAM), etc. A user may interact with the computing device 302 through a keyboard 310, a pointing device 312, and/or a visual display device 314 such as a computer monitor, which may include a user interface 315. The computing device 302 may further include a storage device 308, such as a hard-drive, compact disc-read-only memory (CD-ROM), or other computer readable medium, for storing an operating system 316 and other related software, and for storing application 320, such as a SIMULINK modeling environment, a MATLAB programming environment, etc.

Application 320 includes program editor 322 that is a part of a programming environment, such as the programming environment provided by MATLAB that can be used to write source code and/or to construct a program. One of ordinary skill in the art will appreciate that construction of a program includes any kind of editing of the program, such as inserting new code or revising existing code. Program editor 322 includes testing capability 324 that allows tests to be run in the same environment and mode as the program editor 322. The testing capability 324 also allows tests to be run concurrently as a program is being constructed in the program editor 322. One of ordinary skill in the art will appreciate that program editor 322 or testing capability 324 can be adapted to be included as part of the application 320, or it can be a stand-alone application, module, script, plug-in, or program that responds to calls from the application 320.

The network interface 318 may include a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing the computing device 302 to any type of network 210 capable of facilitating communication among devices and/or performing operations described herein. Moreover, the computing device 302 may be any computer device and/or system, such as a workstation, desktop computer, server, laptop, handheld computer or other form of computing or telecommunications device that is capable of communicating with another device/system and/or performing processing operations described herein.

The computing device 302 can be running substantially any operating system such as a version of the Microsoft® Windows® operating systems, Unix operating system, Linux operating systems, MacOS® operating system, etc. Implementations of computing device 302 may further operate an embedded operating system, a real-time operating system, an open source operating system, a proprietary operating system, an operating system for mobile computing devices, and/or another type of operating system capable of running on computing device 302 and/or performing the operations described herein.

Virtualization can be employed in computing device 302 so that infrastructure and/or resources in the computing device 302 can be shared dynamically. Virtualized processors may also be used with modeling/programming environment 320 and/or other software in storage 308. A virtual machine 303 can be provided to handle a process running on multiple processors so that the process appears to be using only one computing resource rather than multiple computing resources. Multiple virtual machines can also be used with one processor. Other computing resources, such as Field Programming Gate Arrays (FPGAs), Application Specific Integrated Circuits (ASICs), Application Specific Instruction Processors (ASIPs), Digital Signal Processors (DSPs), and General Purpose Processors (GPPs), may also be used for executing code and/or software. A hardware accelerator 319, such as implemented in an ASIC, FPGA, or the like, can additionally be used to increase a processing rate of the computing device 302.

Environment 300 may be implemented on a number of computing devices 100 that may be arranged in a cluster or grid. For example, computing device 100 may be interconnected via network 210 in a computing cluster/grid (e.g., a parallel processing distributed cluster/grid). Exemplary embodiments described herein may be offered as services (e.g., web services) in a networked environment. For example, server 230 may provide client 240 with an integrated development environment that allows for concurrent testing of code while the code is constructed. Examples of integrated development environments may include, but not limited to, Eclipse, Visual Studio, JBuilder, Emacs, etc. In one implementation, a concurrent testing capability may be provided to client 240 as a plug-in to an integrated development environment.

Figure 4A:
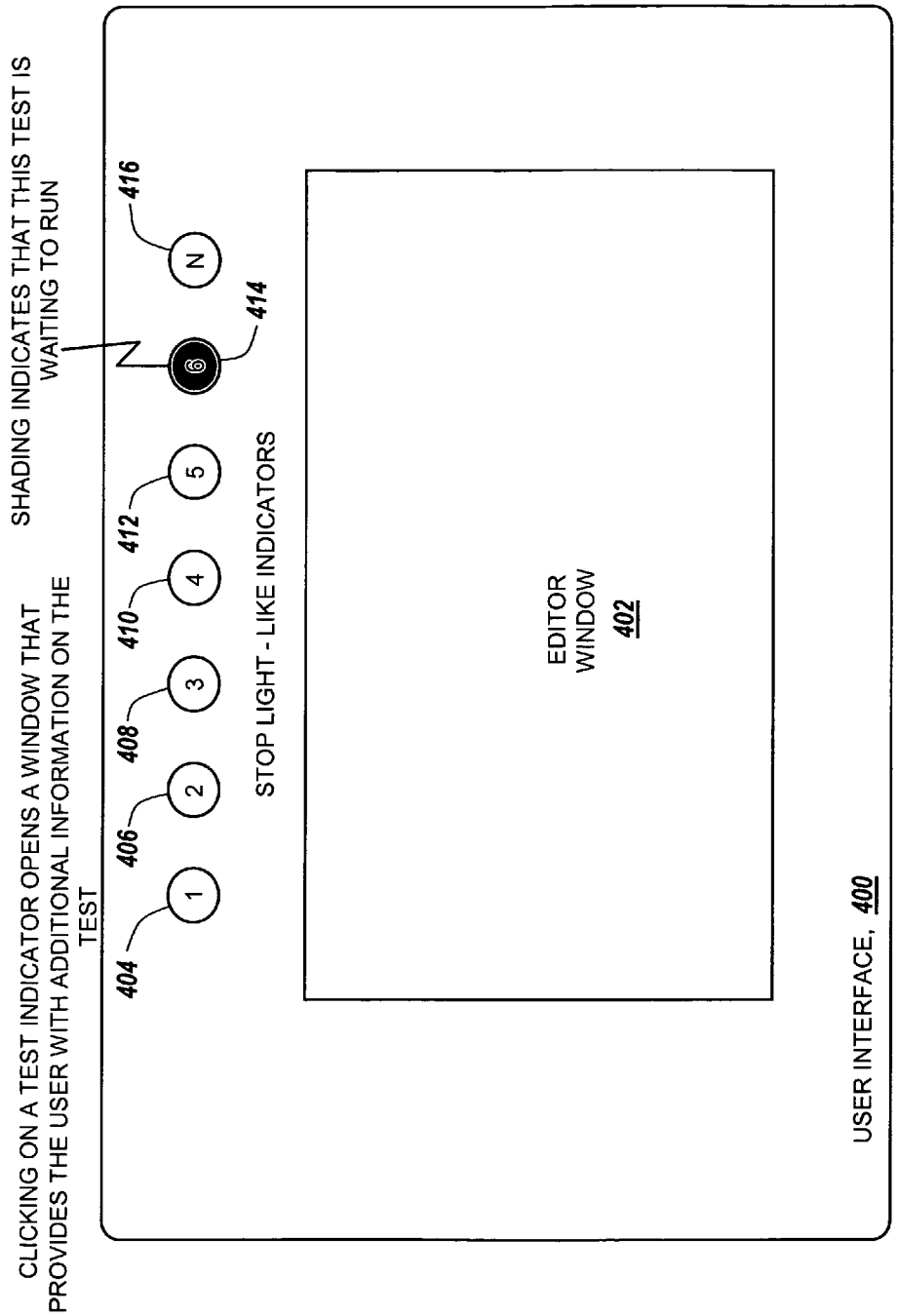
FIG. 4A illustrates an exemplary user interface that includes an editor window and stop light-like test indicators.

FIG. 4A illustrates an exemplary user interface 400 that shows an editor window 402 where a user can type code and construct a program. User interface 400 further includes stop light-like test indicators 404, 406, 408, 410, 412, and 416. If a lo test indicator is selected, a window opens and provides the corresponding test and/or additional information on the test. In one embodiment, a test indicator shows a green light when the corresponding test is passed, a yellow light when the corresponding test is running or paused, and a red light when the corresponding test is failed. In another embodiment, a test indicator is shaded, such as shown for test indicator 414, if the corresponding test is waiting to run.

Figure 4B:
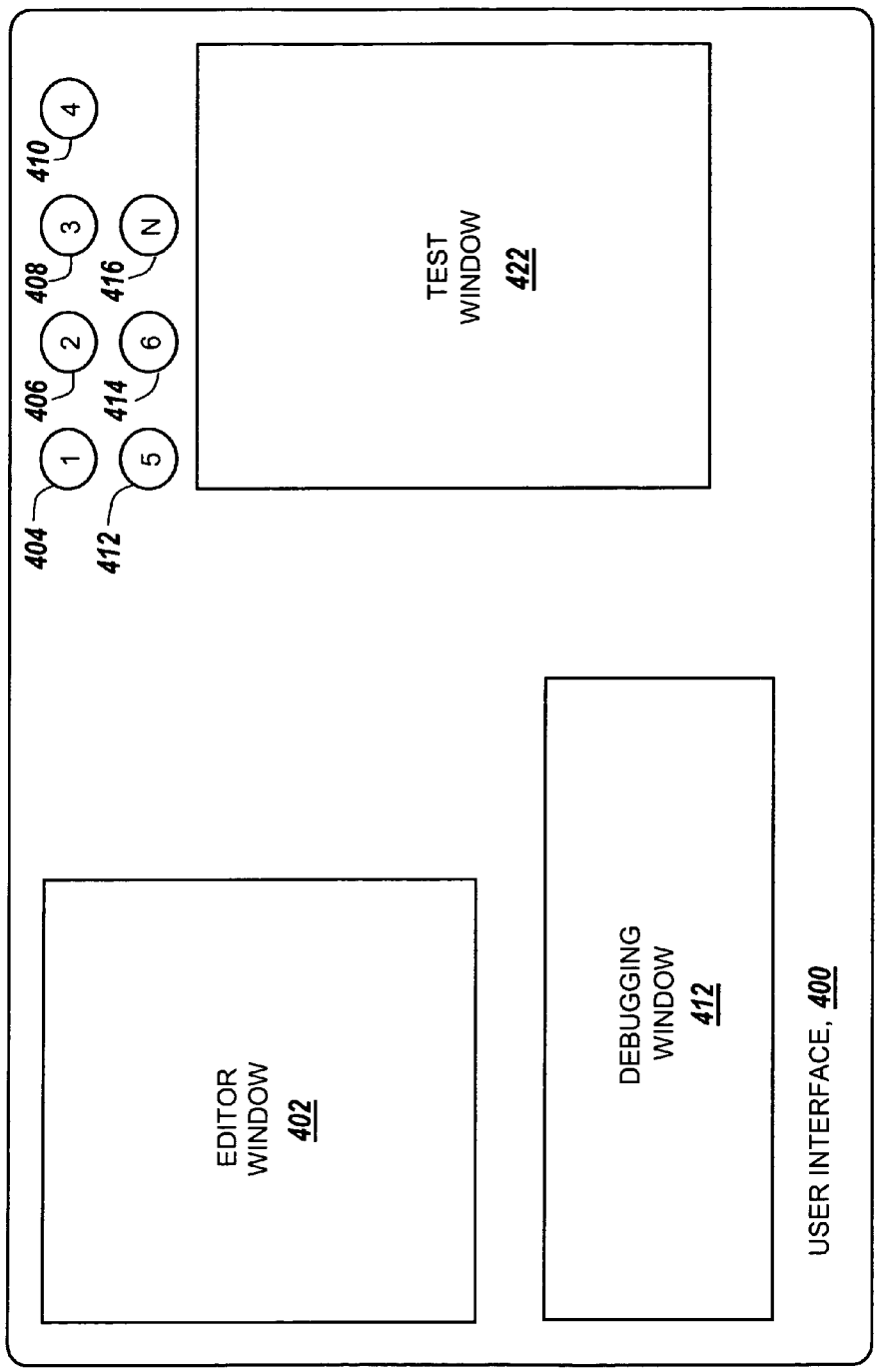
FIG. 4B illustrates an exemplary user interface that includes an editor window, a test window, and a debugger window.

FIG. 4B illustrates an editor window 402, a debugger window 412, and a test window 422 that are concurrently displayed in user interface 400 in one exemplary embodiment. In one embodiment, a user may select one of the test indicators and view the corresponding test in test window 422. In another embodiment, a user may construct a program in editor window 402 and insert one or more breakpoints or watchpoints in the program. In this example, a user may view variable values at a breakpoint or watchpoint in debugger window 412. In addition, a user may also view errors, such as syntax error, unresolved symbols, etc., in the debugger window 412 as well.

Figure 5:
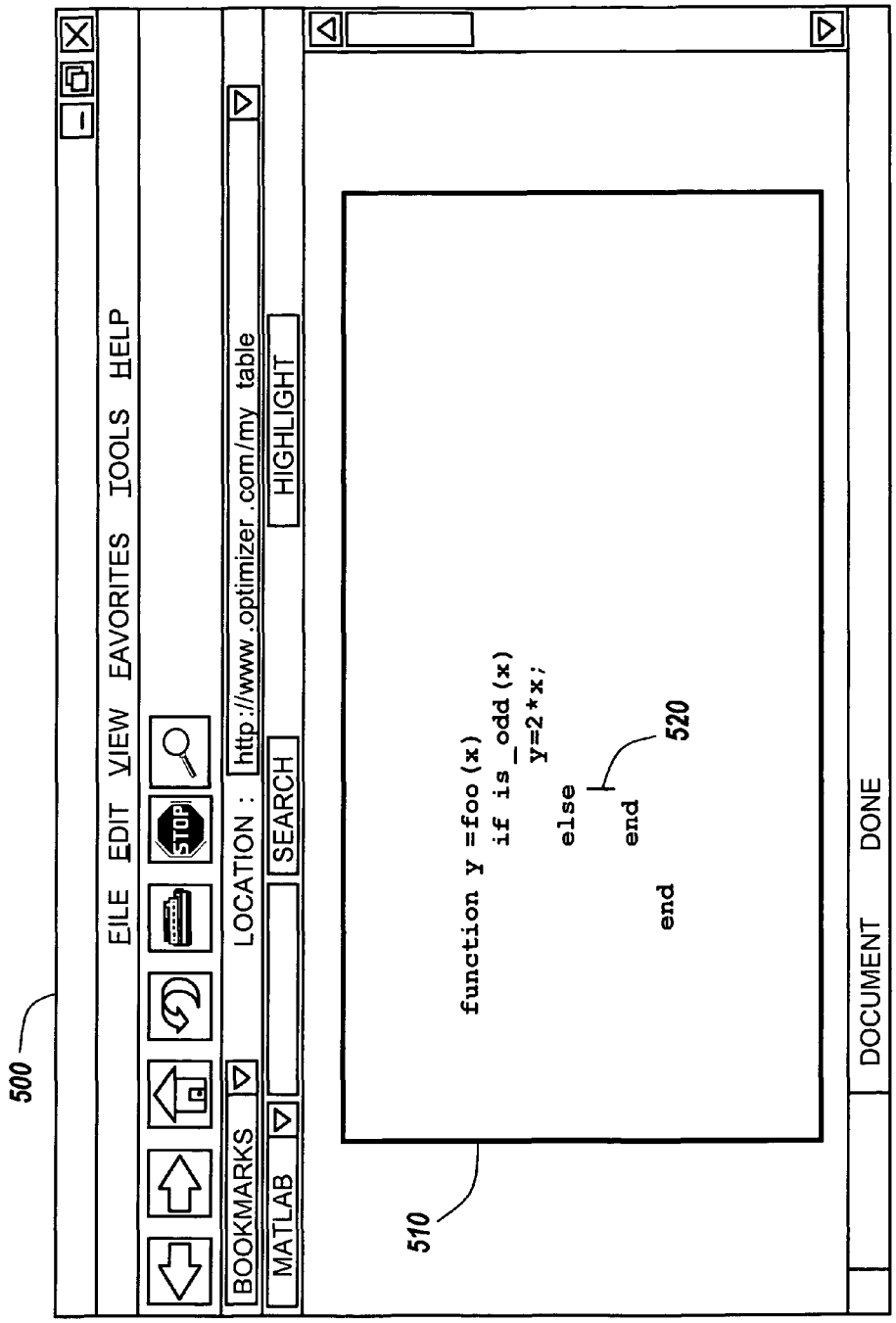
FIG. 5 illustrates a user interface that shows a text example that includes breakpoints.

FIG. 5 illustrates an exemplary user interface 500 that shows an editor window 510 that utilizes a position of the cursor 520 as a breakpoint. In one embodiment, additional breakpoints may be inserted at locations other than the position of the cursor 520. In another embodiment, the breakpoint inserted at the position of the cursor 520 moves as the position of the cursor 520 changes.

Exemplary implementations may be used to allow simultaneously building and testing of a program written in a graphical modeling environment, such as SIMULINK from The MathWorks, Inc. of Natick, Mass. A user may create or edit a graphical model using program editor 122. For example, a user may create a graphical model that includes a number of graphical modeling components, such as blocks and connections between blocks. Exemplary implementations may test blocks in the model while the user continues to create additional blocks or connections. For example, test data that may be presented to testing capability 324 for blocks in the model and this test data can be used to test the portion of the model that has been created. For example, variable values for blocks in the model can be inspected. The testing capability 324 can insert breakpoints or watchpoints in the model or in code generated from the model. In one embodiment, breakpoints and/or watchpoints can be used to prevent testing of a graphical modeling component, such as a block, until the user has finished editing the graphical modeling component.

Test status and test coverage can also be obtained during construction of a graphical model. For example, a user can observe which tests are "waiting" for a graphical modeling component to be completed so that the test(s) can be run. On the other hand, if all tests have run to completion and the user has not finished constructing the graphical model, then it may be an indication that the test coverage is inadequate at least with respect to the current graphical modeling component that the user is editing. The user may then choose to create a test or supply additional test(s) to the testing capability so that additional test coverage may be obtained.

Figure 6:
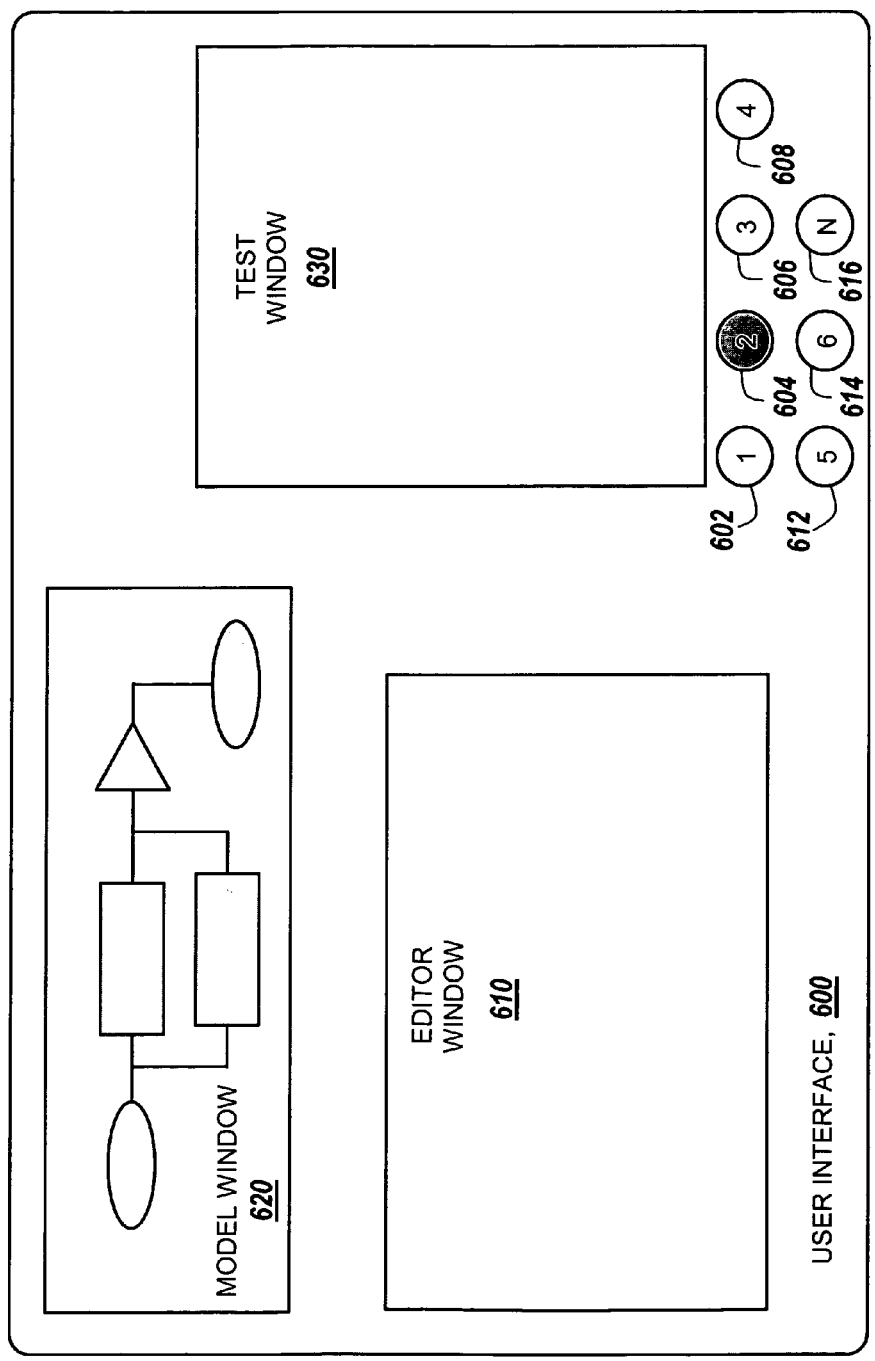
FIG. 6 illustrates an exemplary user interface for editing and testing a graphical model.

FIG. 6 illustrates a user interface 600 that may show a model window 620 showing a graphical model. User interface 600 may show an editor window 610 where a graphical model may be edited. User interface 600 may show test window 630 where a content of a test program or additional information of the test may be shown. User interface 600 may include stop light-like indicators 602, 604, 606, 608, 612, 614, and 616. In one embodiment, a test indicator shows a green light when the corresponding test is passed, a yellow light when the corresponding test is running or paused, and a red light when the corresponding test is failed. In another embodiment, a test indicator is shaded, such as shown for test indicator 604, if the corresponding test is waiting to run.

Exemplary implementations may be used with constraint-based systems, such as Microsoft Excel, where formulas are placed into specific locations (cells). In a constraint-based system, input values may be obtained from or may be based on values at other locations. For example, a formula in one cell may generate an output that is used by another cell in another formula. Tests of a program implemented in the constraint-based system may insert test data into specified cells and verify that the results available in other cells are correct.

A macro or a higher level program that reads in an entire spreadsheet or a portion of the spreadsheet as an input may also be tested. For example, unit tests may be used to test a macro or a higher level program. As the macro or the higher level program is being written, a test may use test data to test the macro or the high level program instead of reading values from specified cells to determine if the macro or the higher level program produces the intended results. In one embodiment, test data may be obtained from specified cells in a spreadsheet.

If a value from a certain location/cell is needed in order to perform the test, then not having the value may be analogous to having a breakpoint in a text-based program, where the text-based tests pause and may not continue. In one embodiment, any element that has a value needed by a test but the value has not been assigned, a visual indicator can be used to show that a value is missing from an element before the test can be run to completion. Tests may pass, fail, or be blocked from running to completion. These test statuses can be indicated dynamically so that a user does not need to actively seek a test status. If a user is about to enter a value in a cell and no test is waiting for the value, then a user knows that there is a test coverage problem. In one aspect of the present invention, testing capability 324 can provide a warning when all tests have been complete and the user is still editing a program.

Figure 7:
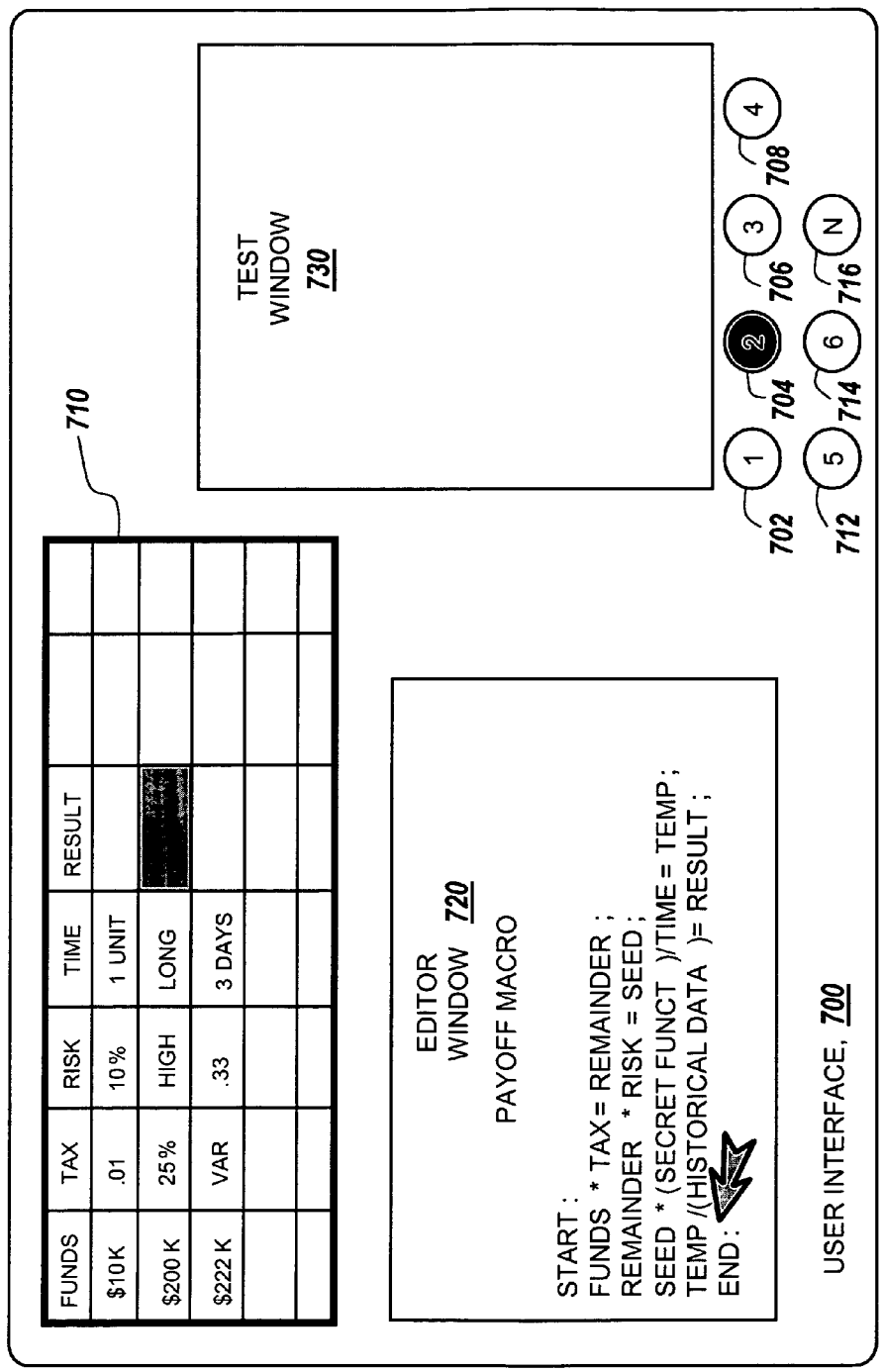
FIG. 7 illustrates an exemplary user interface for editing and testing a macro related to a spreadsheet.

FIG. 7 illustrates a user interface 700 for editing and testing a macro related to a spreadsheet. User interface 700 includes a spreadsheet 710 that includes various data in various cells. User interface 700 may include an editor window 720 that shows a macro that a user is constructing. User interface 700 may include a test window 730 that shows contents of a test program or additional information about the test program. User interface 700 includes stop light-like indicators 702, 704, 706, 708, 712, 714, and 716. In one embodiment, a test indicator shows a green light when the corresponding test is passed, a yellow light when the corresponding test is running or paused, and a red light when the corresponding test is failed. In another embodiment, a test indicator is shaded, such as shown for test indicator 704, if the corresponding test is waiting to run.

Figure 8:
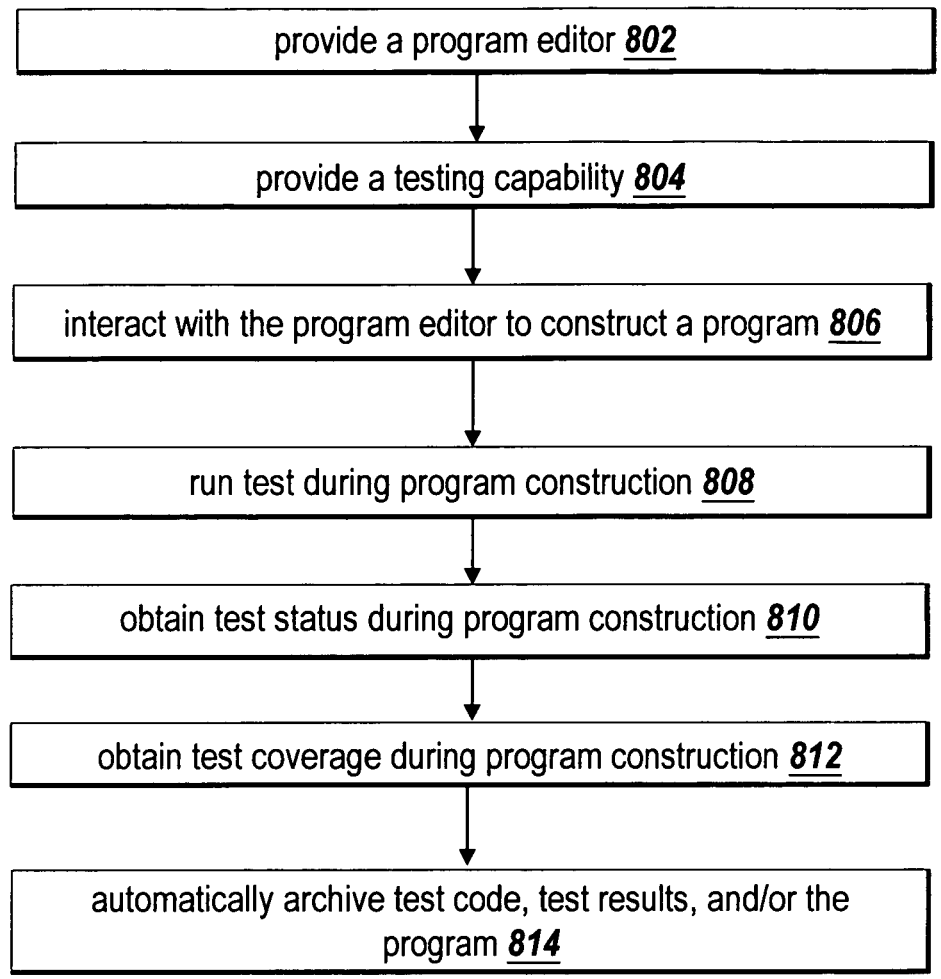
FIG. 8 illustrates a flow chart depicting exemplary processing that can be performed to concurrently edit and test a program.

FIG. 8 illustrates a flowchart depicting exemplary processing that can be used to practice one or more exemplary embodiments. In step 802, a program editor is provided. The program editor allows a user to construct a program. The editor preferably understands the syntax of the programming language that the user uses to construct the program. In step 804, a testing capability is provided. The testing capability may be a part of the program editor. The test capability allows a test to be run against the program during construction of the program without having to switch out of the editing mode and/or environment and into a testing/debugging mode and/or environment. For example, as a user is writing a code, the partially completed code can be tested concurrently so that if the user made a mistake, the mistake can be detected and correctly immediately. Running a test against a program during program construction allows processing resources to be utilized for testing when they might otherwise remain idle, e.g. a processor remaining idle while a programmer contemplates aspects of program development without interacting with a keyboard or other input device.

Testing capability may be provided with different kinds of tests, including unit tests, to test a program. In one embodiment, a test may be performed at the module or application level, such as tests of coding style, modeling style, performance, or complexity. For example, McCabe complexity can be tested as the program is being written. McCabe complexity, also referred to as cyclomatic complexity, is a software metric that provides a measurement of the number of linearly independent paths through a program's source code.

In step 806, the testing capability interacts with the program editor that allows a user to construct a program. The testing capability may allow a user to choose what test should be used for testing the current program that is under construction. The testing capability may provide a user with a list of available tests for a user to choose from. Alternatively, the user may provide his/her custom test(s) to be used by the testing capability to test a program. In one embodiment, multiple tests may be specified to be run during construction of the program. If multiple tests are chosen, the tests can be run in parallel or in series. A user may also choose to run a subset of the chosen tests, such as a test that did not complete for the last edit or the tests that cover the portion of the code that is currently being edited. One of ordinary skill in the art will appreciate that there are many different combination of tests that a user can choose to run.

Once a test is chosen, the test can be run during construction of the program in step 808. Test status can be dynamically obtained during construction of the program in step 810. In one exemplary implementation, current test status may always be visible to a user. In another exemplary implementation, current test status may periodically be visible to a user or may be visible to a user on demand (e.g., when a user enters a command that causes current test status information to be displayed to the user).

Implementations that continuously provide current status information to the user may immediately inform the user when a test has failed. The user may commence trouble shooting the failed test upon notification of the test status without having to wait for program execution to complete. Notifications may be used to alert the user to errors in tested code (e.g., may identify a line of code containing an error) and/or to inform the user that a portion of code passed testing. For example, the user may receive an indication that code testing has completed and no errors were encountered.

In one embodiment, test data may be provided to test against a program to detect a semantic error that would cause run-time errors. In one embodiment, the program may be written in a dynamic programming language. A program that is written in a dynamic programming language may change its structure during runtime, such as functions may be introduced or removed, new classes of objects may be created, new modules may appear, etc. Although these behaviors at runtime may be encoded by most programming languages, a dynamic programming language provides direct tools to make use of these runtime behaviors. Some examples of dynamic programming languages include the MATLAB programming language, PYTHON programming language, and PHP programming language.

In one embodiment, semantic errors may be detected during construction of a program. For example, the order of multiplication of matrices and the order of subscripts are common places where errors may appear. Exemplary implementations facilitate identification of these errors, as well as other types of errors, as soon as they are introduced in the program. In contrast, other types of techniques may require that the user wait until the completion of the program writing activities (i.e., the end of user written code activities) before testing of the code can begin.

In step 812, test coverage may be obtained during construction of the program. Test coverage provides information about portions of a program that have been tested by one or more specified tests. Test coverage may include procedural-level test coverage, line-level test coverage, condition coverage, etc. In one implementation, test coverage may be obtained by inserting probes (e.g., certain types of code) into portions/locations of a program. For example, probes can be inserted into code at a source level or an executable level. In addition, probes can be inserted at run time, such as via an in-memory copy of the program.

In one embodiment, different techniques may be used to show test coverage. For example, a percentage may be used to identify an amount of tested code in relation to all of the code making up a program. Percentage type measures can also be used to identify a number of execution methods or a number of conditions that have been tested.

Exemplary implementations may indicate other aspects of a program. For example, one implementation may identify portions of code that were not tested. Untested code may be identified or displayed to a user via a program editor or other type of user interface. In another implementation, the number of times a line of code, a condition, or an execution method are executed/tested may be identified and/or displayed to the user. For example, in one implementation, an editor may display a cursor or other type of indicator next to a particular line of code condition, and/or execution method.

Lastly, when the program is completed and passes all the tests, application 320 can automatically archive the program, the tests, and/or the test results in step 814 for later reference. The archive may be stored in storage 308, a source code control system, a database, or other storage medium. Hence, as the program is completed, the present invention requires less time compared to the prior art to complete running all the tests and/or to find and correct any bug/error in the program.

Figure 9:
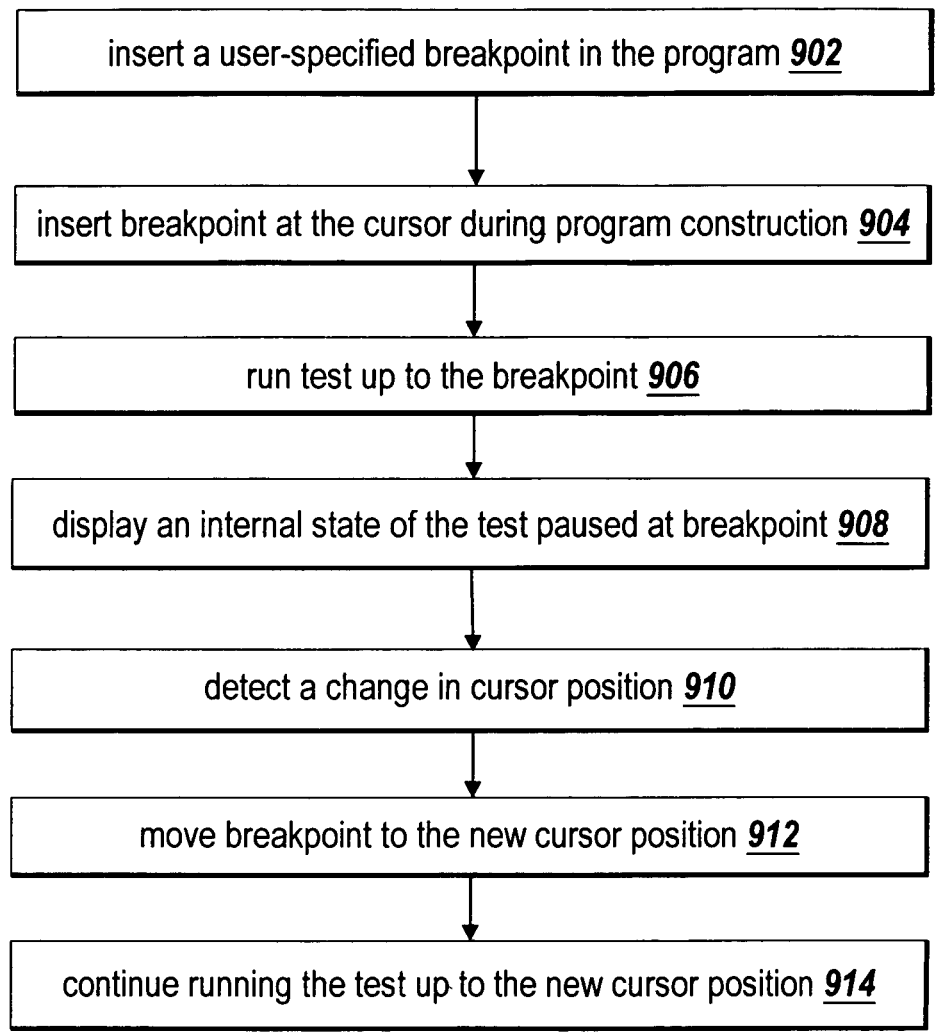
FIG. 9 illustrates a flow chart depicting exemplary processing that may be performed to allow the use of breakpoints for interacting with a program.

FIG. 9 illustrates a flowchart depicting exemplary processing that can be used when one or more breakpoints are used in the exemplary embodiments. In one implementation, breakpoints may be used to stop a running test. For example, a breakpoint can pause a test running against a program. In step 902, a user may specify code locations where breakpoints are to be inserted. In step 904, a breakpoint may be inserted at the position of the cursor in the program.

A test that is run during construction of the program may pause at the breakpoint in step 906. For example, testing may stop at the cursor location of step 904 when test logic 130 is configured to stop at a location identified by a cursor. Exemplary implementations that interact with breakpoints may operate with standard debugging features, such as conditional and/or unconditional breakpoints and/or watchpoints, display and/or range checking for variables.

Exemplary implementations may cause testing to resume when the user generates a new line of code and may test the new line of code. For example, testing may resume until a new cursor position is reached, where the cursor position indicates the end of written code. In one implementation, a paused test may not resume until the user manually re-activates testing.

In step 908, an internal state of the test at a breakpoint location may be displayed to a user. Internal test states may include values for variable at the breakpoint location. These values can be displayed to the user to help the user understand a behavior of the program. One of ordinary skill in the art will appreciate that variable values are not the only type of information that can be obtained at a breakpoint location.

Exemplary implementations allow the user to see effects of newly written code with respect to tests. Exemplary implementations further allow the user to return to a previous location (e.g., by moving a cursor to an earlier line of code) and rerun one or more tests on the earlier line(s) of code. For example, a user may wish to return to an earlier line of code when a test produces an unexpected and/or undesired result or behavior.

Exemplary implementations may further allow states related to tests to be captured automatically or based on a user input. For example, a user may issue an undo instruction (e.g., using a program editor) to a system to delete all, or a portion of most recently typed code. The undo instruction may cause various tests to "undo" as well. In other words, the various tests are returned to a previous testing state/result. In another embodiment, some or all the tests may be rerun when a user issues an undo instruction to the system. Exemplary implementations may maintain a log, a stack, etc., to keep track of changes to the program, rerun tests, etc., so that a user may choose to return to a previous state of the program, to a previous test, and/or to a previous test result.

In step 910, a change in the cursor position may be detected. This detection may cause a breakpoint inserted at the old cursor position to be moved to the new cursor position in step 912. A test that is paused at the old cursor position may be resumed and run up to the new cursor position in step 914. Exemplary implementations allow tests to be run simultaneously with code construction activities. Exemplary implementations further allow tests to be run up to a determined location within the constructed code, such as a location identified by a cursor.

An illustrated example is provided to further describe features and/or capabilities of exemplary embodiments. This example is representative of an implementation and other implementations may be readily apparent based on the example and/or other teachings in the instant patent application. Therefore, the example is not intended to be limiting.

Assume that a user is writing a program called foo that takes in a number as an input and returns twice the number if the input number is odd, and half the number if the input number is even. Two tests are specified to be used to test the program foo. The two tests may be:

```
Test 1: if (foo(3) !=6) error; else OK
Test 2: if (foo(4) !=2) error; else OK
```

The user may commence writing code for the foo program using an editor. At a first point in time, the program may appear in the editor as:

```
function y=foo(x)
    if is_odd(x)
```

-continued

```
        y=2*x;
        <cursor is here>
    end
end
```

At the first point in time, test 1 and test 2 can be running. Test 1 may run and may pause at the cursor position while test 2 may run and may fail, e.g., test 2 may fail prior to the cursor position.

The failure of test 2 may cause an indicator, such as a warning sound, symbol, etc., to be provided to the user to inform the user that test 2 has failed. The user may determine that additional code needs to be written for the foo program before the foo program will operate in an intended manner. The user may continue generating code and at a second point in time, the foo program may appear as:

```
function y=foo(x)
    if is_odd(x)
        y=2*x;
    else
        <cursor is here>
    end
end
```

At the second point in time, test 1 may run to completion. Completion of test 1 may indicate that the foo program passes test 1. Test 2 may also run at the second point in time and may pause at the cursor position (i.e. testing using test 2 is incomplete).

A user who considers testing from a code coverage perspective may determine that the foo program is correct when an input is an odd number. If the user is unsure about code coverage for even input numbers, the user may now focus on writing/editing code that concerns even input numbers. The completed foo program may appear as:

```
function y=foo(x)
    if is_odd(x)
        y=2*x;
    else
        y=x/2;
    end
end
```

The cursor may be removed by the user so that a test is not paused due to a breakpoint inserted at the cursor position. Both test 1 and test 2 may be run to completion and indicate that the program passes both tests. Test coverage information may show that all conditions and all lines in the program have been tested. One of ordinary skill in the art will appreciate that one or more graphical or textual user interfaces may be used to indicate whether a test has passed or failed and the present invention is not limited to any specific text-based interface or graphical user interface.

Exemplary implementations may be applied to multiple programs that can be constructed in parallel (i.e. substantially simultaneous with one another) and/or tested against one another. For example, a user may be constructing program 1 and program 2 in parallel, where program 1 is used as a test program for program 2 and program 2 is used as a test program for program 1. Programs that are written in parallel and tested against each other may enforce a constraint, such as consistency of interfaces, conformances to protocols, etc., among the multiple programs.

In addition, when a test code is used to test a program, the test code can be viewed as being tested by the program because an erroneous result produced by running the test code against the program may not indicate an error in the program but indicate that the test code is defective. A user may modify the test code in an editor to improve the quality of the test code and use the program to test against the test code.

Figure 10A:
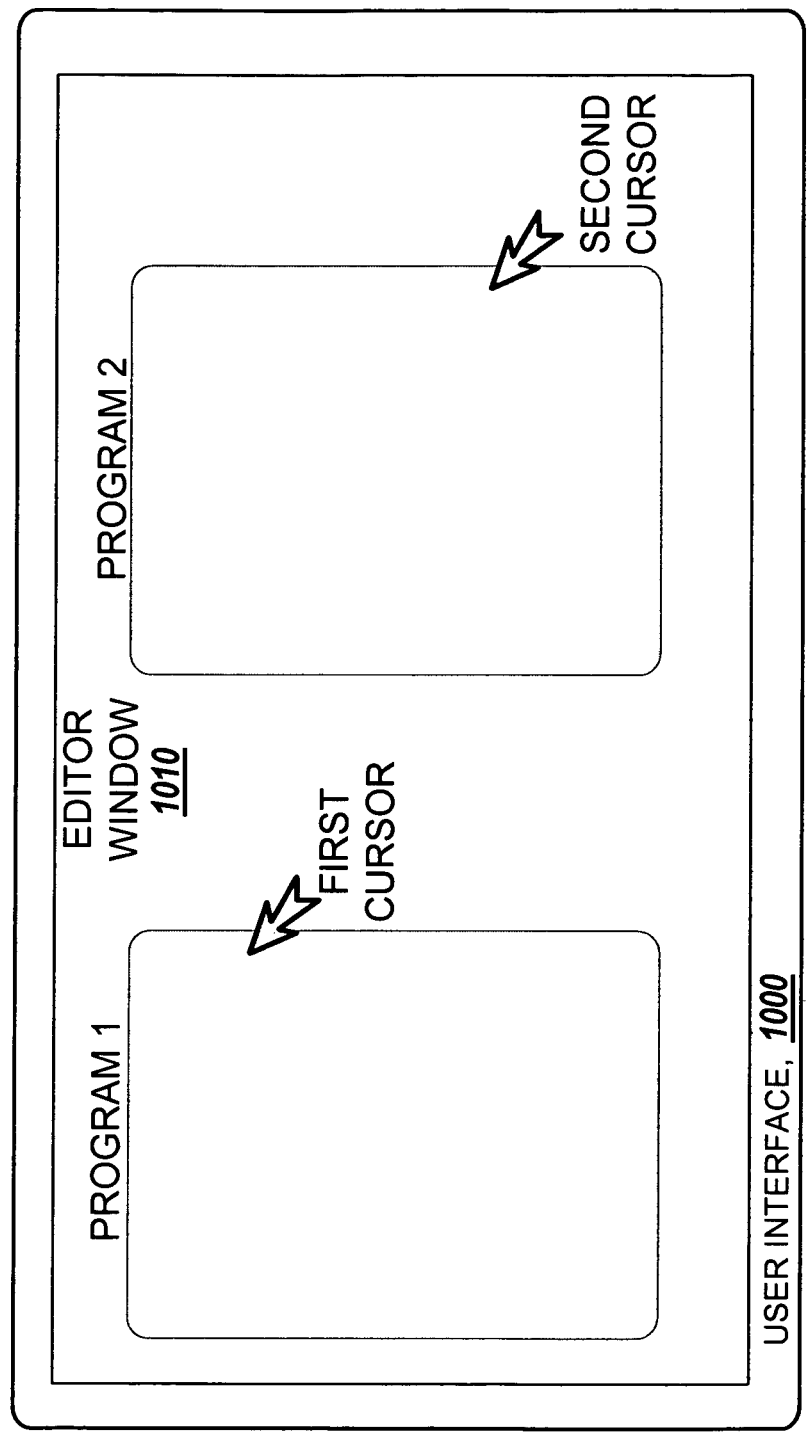
FIG. 10A illustrates an exemplary user interface with an editor window that has two programs.

FIG. 10A illustrates an exemplary user interface 1000 that may show an editor window 1010 with program 1 and program 2. In one embodiment, program 1 may be the program being created and program 2 may be the testing program. In one embodiment, a user may go from program 1 that is being developed to a testing program, such as program 2, so that the user may modify the testing program to improve the testing program, such as making sure that all lines of code are tested (e.g., to ensure complete code coverage). In another embodiment, a testing program, such as program 2, may be modified as program 1 is being constructed.

FIG. 10B illustrates that program 1 and program 2 may be shown in two different editor windows in user interface 1000. In one embodiment, program 1 may be shown in a first editor window 1040 while program 2 may be shown in a second editor window 1050. In one embodiment, program 1 and program 2 can be constructed in parallel and tested against each other. In another embodiment, breakpoints may be used in program 1 and/or program 2 for testing and/or debugging purposes.

Figure 11:
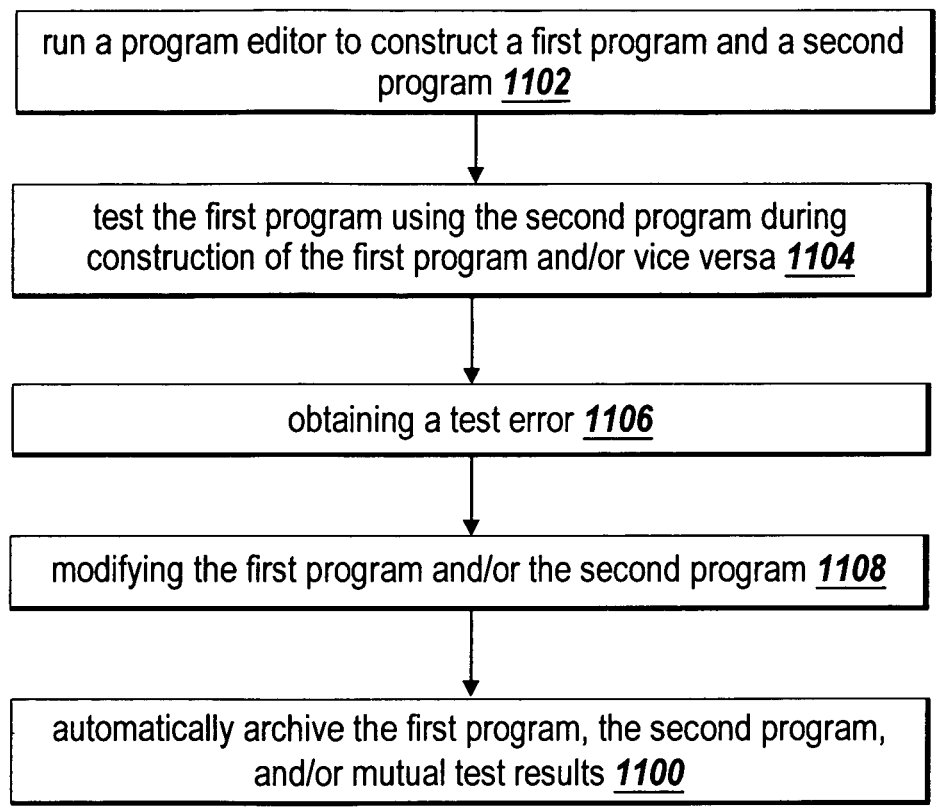
FIG. 11 illustrates a flow chart depicting exemplary processing that may be performed to allow construction and testing of two programs in an exemplary embodiment.

FIG. 11 illustrates a flow chart depicting steps that may be taken to construct two programs in parallel and perform testing in an exemplary embodiment. In step 1102, a program editor is run to construct a first program and a second program. The first program and/or the second program may be partially complete. The user may specify that the testing capability 324 use the second program to test the first program and use the first program to test the second program.

In step 1104, the first program is tested by the second program during construction of the first program and/or the second program is tested by the first program during construction of the second program. In one embodiment, editing changes in the first program may cause the first program to retest the second program. The second program may also be used to test the first program at the same time.

In step 1106, a test error may be obtained from using the first program to test the second program or using the second program to test the first program. Such a test error does not necessarily indicate that the program that the user last edited is the one that causes the error. In other words, either the first or the second program may cause the test error. In step 1108, the first program and/or the second program may be modified to correct code errors that may have lead to the test error. Lastly, the first program, the second program, and/or test results may be archived in step 1110.

FIG. 12 illustrates an exemplary testing report 1200 that may be generated after one or more tests are run against a program. Testing report 1200 may include a test name 1210 that includes the name of the program that was tested. Testing report 1200 may include lines of code 1212 that shows the total lines of code in the program. Testing report 1200 may include lines tested 1214 that shows the number of lines in the program that were tested.

Testing report 1200 may include test results 1216 showing whether tests are passed or failed. Testing report 1200 may show detailed test log 1218 that is a file a user may retrieve from storage to review detailed data related to the tests. Testing report 1200 may show code coverage 1220 so that a user may know what portion of the program was tested. Testing program 1200 may show time required for test completion 1222 to indicate an amount of time taken for running the tests. Testing program 1200 may include an item 1224 showing a person or entity that approves the test results.

Some exemplary embodiments are described for illustrative purposes relative to a MATLAB programming environment or SIMULINK graphical modeling environment. However, one of ordinary skill in the art will appreciate that the present invention may be applied to programming tasks with any programming environment, such as the JAVA programming environment, the Mathematica® programming environment from Wolfram Research, Inc., the Mathcad programming environment from Mathsoft Engineering & Education Inc., the Maplem™ programming environment from Maplesoft, a division of Waterloo Maple Inc., the C/C++ programming environment.

Those skilled in the art will appreciate that the principles and concepts of the present application are equally applicable to other graphical modeling applications, such as, TargetLink and Real-Time Interface from dSPACE GmbH, RT-LAB™ from Opal-RT Technologies, Inc., EXITE from EXTESSY AG, LabVIEW®, MATRIXx from National Instruments, Inc., SystemVue™ from Eagleware-Elanix Corporation, COSSAP from Synopsys, Inc., HyperSignal® from Hyperception, Inc., Dymola from Dassault Systèmes, or Rhapsody and Statemate from Telelogic AB. Furthermore, one ordinarily skilled in the art will appreciate that the present invention may apply to any graphical modeling environment, such as one providing modeling with a Unified Modeling Language (UML), Hardware Description Language (HDL), or that provides a physics modeling domain.

Exemplary implementations may allow for concurrently testing code while the code is being created.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 8, 9, and 11, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware and/or software.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

The scope of the invention is defined by the claims and their equivalents.

I claim:

1. A computing device-implemented method for simultaneously constructing and testing a software program, comprising:
   interacting with a program editor to construct code for the software program;
   the interacting using a processor
   identifying, while the code in the software program is being constructed with the program editor, that a plurality of lines of code in the constructed code forms at least a block of code,
   the identifying using the processor;
   determining, based on the identifying and while the code in the software program is being constructed with the program editor, that a sufficient amount of constructed code for the software program is present in the program editor in order to perform a test against the constructed code based on implemented testing functions in the test,
   the determining using the processor; and
   testing the software program by performing the test, while the code in the software program is being constructed with the program editor, the testing performed based at least on the determining that the sufficient amount of code is present in the software program and a required amount of resources are to perform the test against the constructed code to produce a test result, wherein the test result is provided to a user via visual or auditory indicators, wherein the software program is tested without switching between a programming mode or a programming environment to a debugging mode or a debugging environment.

2. The method of claim 1, wherein the test is a unit test supplied by a user.

3. The method of claim 1, wherein the test tests at least one of:
   coding style, modeling style, performance, or
   complexity of the software program.

4. The method of claim 1, further comprising:
   receiving a selection that identifies the test, from among a plurality of tests.

5. The method of claim 4, wherein testing includes running the selected test dynamically without user interaction.

6. The method of claim 1, further comprising:
   obtaining a status of the testing while the code in the software program is being constructed.

7. The method of claim 6, wherein the obtaining is performed dynamically.

8. The method of claim 1, further comprising:
   obtaining test coverage information while code in the software program is being constructed.

9. The method of claim 8, wherein the test coverage information is produced by the testing.

10. The method of claim 1, further comprising:
    inserting a breakpoint in the software program while code in the software program is being constructed.

11. The method of claim 1, wherein the software program is tested up to a point in the software program that is indicated by a first position of a cursor.

12. The method of claim 11, further comprising:
    detecting a change in the first position of the cursor to a second position, the second position of the cursor indicating a second point in the software program; and
    testing the software program up to the second point in the software program.

13. The method of claim 11, further comprises:
    detecting a change, the change representing movement from the first position of the cursor to a second position of the cursor, the second position of the cursor indicating a second point in the software program; and
    testing with respect to instructions that precede the second point in the software program.

14. The method of claim 1, further comprising:
    automatically archiving at least one of:
    the test,
    test results produced by the test, or
    the software program after the software program is completed and the test has passed.

15. The method of claim 1, wherein the method is performed by a multi-core computer.

16. The method of claim 1, wherein the method is performed by a plurality of processors.

17. The method of claim 16, wherein the interacting with the program editor is performed by a first processor and the testing is performed by a second processor.

18. The method of claim 1, wherein the method is performed by a cluster of computing devices.

19. The method of claim 18, wherein the interacting with the program editor is performed by a first computing device and the testing is performed by a second computing device.

20. The method of claim 1, wherein the method is performed by a grid of computing devices.

21. The method of claim 1, wherein test logic performing the testing or the program editor is provided to a computing device as a service.

22. The method of claim 1, wherein the program editor operates with an integrated development environment.

23. The method of claim 22, wherein the integrated development environment includes Eclipse, Visual Studio, JBuilder, or Emacs.

24. The method of claim 22, wherein the testing is performed by a plug-in of the integrated development environment.

25. A system comprising:
    a processor for:
    interacting with a program editor to construct code for a software program,
    identifying, while the code in the software program is being constructed with the program editor, that a plurality of lines of code in the constructed code forms at least a block of code,
    determining, while the code in the software program is being constructed with the program editor, whether a sufficient amount of constructed code for the software program is present in the program editor in order to perform a test based on a first criteria,
    determining, while the code in the software program is being constructed with the program editor, whether a sufficient amount of constructed code for the software program is present in the program editor in order to perform the test based on a second criteria, and
    running the test against the software by performing the test against the constructed code to produce a test result, wherein the test result is provided to a user via visual or auditory indicators, wherein the software program is tested without switching between a programming mode or a programming environment to a debugging mode or a debugging environment, while the code in the software program is being constructed with the program editor, based at least on the determining that the sufficient amount of constructed code for the software program is present in the program editor and a required amount of resources are available in order to perform the test based on the first criteria or the second criteria.

26. The system of claim 25, wherein the test is run as part of a testing capability of the program editor.

27. The system of claim 25, wherein the test is a unit test supplied by a user.

28. The system of claim 25, wherein the test is a test on coding style, modeling style, performance, or complexity of the software program.

29. The system of claim 25, wherein the test is selected from a plurality of tests.

30. The system of claim 29, wherein the test is selected to dynamically run while code in the software program is being constructed.

31. The system of claim 25, wherein the processor further: provides a status of the test while code in the software program is being constructed.

32. The system of claim 25, wherein the processor further: inserts a breakpoint at a position of a cursor in the software program before running the test.

33. The system of claim 25, wherein the processor further: obtains test coverage information while code in the software program is being constructed.

34. The system of claim 25, wherein the processor further: displays at least one of a result of the test or a status of the test while code in the software program is being constructed.

35. The system of claim 26, further comprising: a multi-core computer that executes the program editor or the testing capability.

36. The system of claim 26, further comprising: a plurality of processors that executes the program editor or the testing capability.

37. The system of claim 36, wherein a first processor executes the program editor and a second processor executes the testing capability.

38. The system of claim 26, further comprising: a cluster of computing devices that executes the program editor or the testing capability using one or more computing devices in the cluster.

39. The system of claim 38, wherein a first computing device of the cluster of computing devices executes the program editor and a second computing device of the cluster of computing devices executes the testing capability.

40. The system of claim 26, further comprising: a grid of computing devices that executes the program editor or the testing capability.

41. The system of claim 26, wherein the testing capability is offered as a service to the system.

42. The system of claim 25, wherein the program editor operates with an integrated development environment.

43. The system of claim 42, wherein the integrated development environment includes Eclipse, Visual Studio, JBuilder, or Emacs.

44. The system of claim 26, wherein the testing capability is implemented as a plug-in of an integrated development environment.

45. A non-transitory computer-readable storage medium storing executable instructions that are executable by a computing device, the medium storing one or more instructions for:
  interacting with a program editor for constructing code for a software program;
  identifying, while the code for the software program is being constructed with the program editor, that a plurality of lines of code in the constructed code forms at least a block of code;
  determining, based on the identifying and while the code in the software program is being constructed with the program editor, that a sufficient amount of constructed code for the software program is present in the program editor in order to perform a test against the constructed code based on implemented testing functions in the test;
  determining, while the code in the software program is being constructed with the program editor, whether a predetermined amount of computing resources is available to perform a test; and
  testing the software program by performing the test against the constructed code to produce a test result, wherein the test result is provided to a user via visual or auditory indicators, wherein the software program is tested without switching between a programming mode or a programming environment to a debugging mode or a debugging environment, while code in the software program is being constructed with the program editor, based at least on the determining that the sufficient amount of code is present in the software program and the predetermined amount of computing resources is available to perform the test.

46. The medium of claim 45, wherein the test is a unit test supplied by a user.

47. The medium of claim 45, wherein the test tests coding style, modeling style, performance, or complexity.

48. The medium of claim 45, further comprising one or more instructions for:
  providing a plurality of tests.

49. The medium of claim 45, further comprising one or more instructions for:
  receiving an input to select the test; and
  selecting the test based on the input.

50. The medium of claim 45, further comprising one or more instructions for:
  obtaining a status of the testing while code in the software program is being constructed.

51. The medium of claim 45, further comprising one or more instructions for:
  obtaining test coverage information while code in the software program is being constructed.

52. The medium of claim 45, further comprising one or more instructions for:
  receiving an input to specify a position in the software program;
  inserting a breakpoint in the software program at the specified position while code in the software program is being constructed.

53. The medium of claim 45, further comprising one or more instructions for:
  archiving at least one of:
    an identifier that identifies the test,
    a test result produced while testing the software program, or
    the software program.

54. The medium of claim 45, wherein the computing device is a multi-core computer.

55. The medium of claim 45, wherein the computing device includes a plurality of processors.

56. The medium of claim 45, wherein the testing of the software program is offered as a service to the computing device.

57. The medium of claim 45, wherein the program editor operates with an integrated development environment.

58. The medium of claim 45, wherein the testing of the software program is implemented via a plug-in.

59. The medium of claim 45, wherein the computing device is one of a plurality of computing devices operating in a grid.

60. The medium of claim 59, wherein the grid comprises one or more clusters.

* * * * *

UNITED STATES PATENT AND TRADEMARK OFFICE
CERTIFICATE OF CORRECTION

PATENT NO. : 9,015,671 B2  Page 1 of 1
APPLICATION NO. : 11/646147
DATED : April 21, 2015
INVENTOR(S) : Steve Johnson It is certified that error appears in the above-identified patent and that said Letters Patent is hereby corrected as shown below:

In the Claims

Column 15, line 3, in claim 1, delete the "," after "program"

Column 16, line 50, in claim 25, delete "a" and insert --the--, in lieu thereof

Column 16, line 54, in claim 25, after "software" insert --program--

Signed and Sealed this
Twenty-ninth Day of September, 2015

Michelle K. Lee
*Director of the United States Patent and Trademark Office*